(12) United States Patent
Lyons

(10) Patent No.: US 12,418,516 B2
(45) Date of Patent: *Sep. 16, 2025

(54) ENCRYPTION-BASED DEVICE ENROLLMENT

(71) Applicant: Zoom Video Communications, Inc., San Jose, CA (US)

(72) Inventor: Karan Lyons, Los Angeles, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,014

(22) Filed: Dec. 4, 2023

(65) Prior Publication Data

US 2024/0106808 A1    Mar. 28, 2024

Related U.S. Application Data

(63) Continuation of application No. 17/390,663, filed on Jul. 30, 2021, now Pat. No. 11,863,539.

(51) Int. Cl.
| | |
|---|---|
| *H04L 29/06* | (2006.01) |
| *H04L 9/32* | (2006.01) |
| *H04L 9/40* | (2022.01) |

(52) U.S. Cl.
CPC ........ *H04L 63/0442* (2013.01); *H04L 9/3242* (2013.01); *H04L 9/3247* (2013.01); *H04L 63/102* (2013.01)

(58) Field of Classification Search
CPC . H04L 63/0442; H04L 9/3242; H04L 9/3247; H04L 63/102
See application file for complete search history.

(56) References Cited

U.S. PATENT DOCUMENTS

| | | | |
|---|---|---|---|
| 9,867,043 B2 * | 1/2018 | Aissi | H04W 12/35 |
| 9,935,953 B1 * | 4/2018 | Costigan | H04L 63/0876 |

(Continued)

FOREIGN PATENT DOCUMENTS

| | | | | |
|---|---|---|---|---|
| WO | WO-2014036021 A1 * | 3/2014 | | G06F 21/57 |
| WO | 2016118542 A1 | 7/2016 | | |
| WO | 2020263938 A1 | 12/2020 | | |

OTHER PUBLICATIONS

U.S. Appl. No. 17/390,663, "Notice of Allowance", Jul. 6, 2023, 14 pages.

(Continued)

*Primary Examiner* — Shawnchoy Rahman

(74) *Attorney, Agent, or Firm* — Kilpatrick Townsend & Stockton LLP

(57) ABSTRACT

One example method includes a device management system detecting an attempt to access a user account by an unenrolled device. The device management system identifies a first enrolled device of the user account by accessing a signature chain of the user account. The device management system facilitates a transmission of a cryptographically-signed enrollment request from the unenrolled device to the first enrolled device. The first enrolled device is configured to cryptographically validate the enrollment request. The first enrolled device is further configured to generate an encrypted attestation message that indicates that the unenrolled device has been authenticated. The unenrolled device can receive and decrypt the encrypted attestation message based on a passcode being displayed on the first enrolled device. The device management system receives a decrypted attestation message from the unenrolled device and updates the signature chain to include a new sequential record for the unenrolled device.

20 Claims, 8 Drawing Sheets

(56) References Cited

U.S. PATENT DOCUMENTS

| | | | |
|---|---|---|---|
| 9,996,684 B2 | 6/2018 | Hoyos et al. | |
| 10,454,674 B1* | 10/2019 | Bar-El | H04L 63/123 |
| 11,356,257 B2 | 6/2022 | Law | |
| 11,863,539 B2 | 1/2024 | Lyons | |
| 2014/0066015 A1 | 3/2014 | Aissi | |
| 2016/0210169 A1* | 7/2016 | Kaufman | G06F 9/50 |
| 2016/0285873 A1* | 9/2016 | Lambert | H04W 12/04 |
| 2017/0063846 A1 | 3/2017 | Mohamad Abdul et al. | |
| 2018/0109418 A1 | 4/2018 | Cammarota et al. | |
| 2018/0254898 A1* | 9/2018 | Sprague | H04L 9/0637 |
| 2019/0116038 A1* | 4/2019 | Sprague | H04L 9/3226 |
| 2019/0140828 A1* | 5/2019 | Wheeler | H04L 9/3242 |
| 2019/0347384 A1 | 11/2019 | Smith | |
| 2020/0007530 A1 | 1/2020 | Mohamad Abdul et al. | |
| 2021/0320805 A1* | 10/2021 | Shockley | G06F 3/0655 |

OTHER PUBLICATIONS

International Application No. PCT/US2022/033943, "International Preliminary Report on Patentability", Feb. 8, 2024, 15 pages.
International Application No. PCT/US2022/033943, "International Search Report and Written Opinion", Sep. 15, 2022, 19 pages.

* cited by examiner

ENCRYPTION-BASED DEVICE ENROLLMENT

CROSS-REFERENCE

This application is a continuation of U.S. patent application Ser. No. 17/390,663, filed Jul. 30, 2021 titled "Encrypted-Based Device Enrollment," the entirety of which is incorporated herein by reference.

FIELD

The present application generally relates to systems and methods for enrolling devices associated with a user account and more specifically relates to systems and methods for using cryptographic keys and signatures to securely enroll devices into the user account.

BACKGROUND

Service providers provide various security measures to protect users from unauthorized access. For example, multi-factor authentication can require a user to retrieve a passcode from another device, so that the passcode is used for logging into the user account. In another example, the service providers can require login passwords to be long and complex, often exceeding 8 characters with a combination of letters, numbers, and special characters. Among these measures, service providers can also restrict user-account access to devices that can be authenticated and enrolled by the user. In particular, the service provider can permit multi-factor authentication to a limited set of trusted devices, which can prevent unauthorized access by other devices.

Malicious attackers can circumvent some of these security measures using various tactics. In particular, they aim to compromise existing techniques that allow enrollment of a new device based on the user entering a passcode (e.g., 4-digit numerical code) shown on a previously enrolled device. For example, an attacker can perform Man-in-the-middle (MITM) attacks, in which the attacker secretly eavesdrops and possibly alters the data exchanged between the devices to manipulate certain operations (e.g., enroll an unknown device to the user account). In another example, the attacker may engage in social engineering to intercept the passcode and enroll the unknown device using the intercepted passcode. Thus, there is a need for securely enrolling devices, in order to prevent malicious attacks against the user account.

SUMMARY

Various examples are described for systems, devices, and methods for using encryption-based device enrollment. One example method includes a device management system detecting an attempt to access a user account by an unenrolled device. The device management system identifies a first enrolled device corresponding to the user account by accessing a signature chain of the user account. In some instances, the signature chain includes a first sequential record identifying the first enrolled device. The device management system facilitates a transmission of an enrollment request and a corresponding cryptographic signature from the unenrolled device to the first enrolled device. In some instances, the cryptographic signature of the enrollment request is generated by using a private cryptographic key of the unenrolled device, and the enrollment request includes a set of long-term cryptographic keys of the unenrolled device to be added into a second sequential record into the signature chain.

The first enrolled device is configured to cryptographically validate the enrollment request at least by decrypting the cryptographic signature of the enrollment request using a public cryptographic key of the unenrolled device. The first enrolled device causes a passcode to be displayed, generates an encrypted attestation message that indicates that the unenrolled device has been authenticated, and transmits the encrypted attestation message to the unenrolled device. In some instances, the encrypted attestation message includes the set of long-term cryptographic keys. The encrypted attestation message can be encrypted using a symmetric cryptographic key derived from the passcode.

The device management system receives a decrypted attestation message from the unenrolled device. In some instances, the decrypted attestation message is the encrypted attestation message that was decrypted based on the passcode being correctly inputted into the unenrolled device. The device management system updates the signature chain to include the second sequential record for the unenrolled device. In some instances, the second sequential record includes the decrypted attestation message and the set of long-term cryptographic keys, and the second sequential record indicates that the unenrolled device has been associated with user account as a second enrolled device.

One example non-transitory computer-readable medium includes processor-executable instructions configured to cause a processor to receive an enrollment request and a corresponding cryptographic signature from an unenrolled device. The cryptographic signature of the enrollment request is generated by using a private cryptographic key of the unenrolled device, and the enrollment request includes a set of long-term cryptographic keys of the unenrolled device to be added into a new sequential record into a signature chain.

The example non-transitory computer-readable medium further includes processor-executable instructions configured to cause a processor to cryptographically validate the enrollment request at least by decrypting the cryptographic signature of the enrollment request using a public cryptographic key of the unenrolled device, cause a passcode to de displayed, generate an encrypted attestation message that indicates that the unenrolled device has been authenticated, and transmit the encrypted attestation message to the unenrolled device. The encrypted attestation message is encrypted using a symmetric cryptographic key derived from the passcode. The encrypted attestation message includes the set of long-term cryptographic keys.

One example device includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to generate an enrollment request and a corresponding cryptographic signature. The cryptographic signature of the enrollment request is generated by using a private cryptographic key of the device, and the enrollment request includes a set of long-term cryptographic keys of the device to be added into a new sequential record into a signature chain. The device transmits, to an enrolled device associated with a user account, the enrollment request and the cryptographic signature.

The device receives, from the enrolled device, an encrypted attestation message indicating that the device has been authenticated. The device detects an input of a passcode, in which the passcode is generated and displayed by the enrolled device. The device uses the passcode to derive a symmetric key. The device decrypts the encrypted attestation message using the symmetric key, thereby generating a decrypted attestation message. The device transmits, to a device management system, the decrypted attestation message and the set of long-term cryptographic keys. The new sequential record is added into the signature chain and includes the decrypted attestation message and the set of long-tern cryptographic keys.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
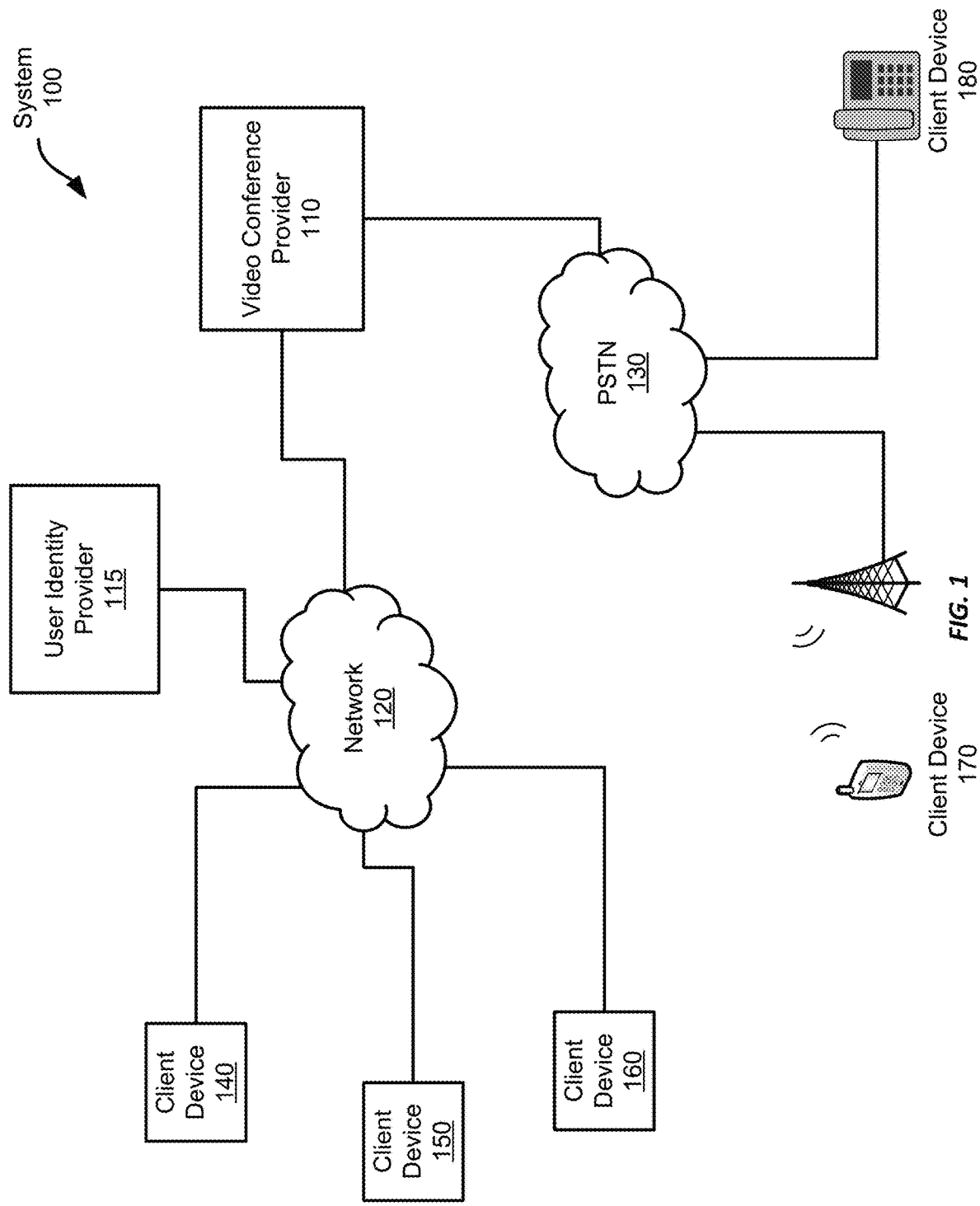
FIG. 1 shows an example system that provides videoconferencing functionality to various client devices, according to some embodiments.

Examples are described herein in the context of systems and methods for encryption-based device enrollment. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

One example method includes a device management system detecting an attempt to access a user account by an unenrolled device. In an illustrative example, a user uses a new mobile device to login to a video conference provider. A device management system of the video conference provider accepts account credentials of the user, but detects that the mobile device has previously not been used. In some instances, the device management system accesses a signature chain of the user account to determine that the device has not been enrolled yet.

The device management system identifies another device that the user has previously used and enrolled—a first enrolled device corresponding to the user account—by accessing the signature chain of the user account. In some instances, the signature chain includes a first sequential record identifying the first enrolled device. The device management system then facilitates a transmission of an enrollment request and a corresponding cryptographic signature from the unenrolled device to the first enrolled device. For example, the device management system can notify the unenrolled device to transmit the enrollment request to the first enrolled device. In some instances, the cryptographic signature of the enrollment request is generated by using a private cryptographic key of the unenrolled device, and the enrollment request includes a set of long-term cryptographic keys that the device management system will add as a new sequential record in the signature chain for the unenrolled device.

Continuing with the above example, the device management system searches through the signature chain to identify a laptop device of the user that had previously been enrolled. The device management system then notifies the mobile device to initiate a device enrollment process, in which the mobile device generates an enrollment request. The mobile device then transmits the enrollment request and its corresponding cryptographic signature to the laptop device.

In this example, the first enrolled device (e.g., the laptop device) is configured to cryptographically validate the enrollment request at least by decrypting the cryptographic signature of the enrollment request using a public cryptographic key of the unenrolled mobile device. This can include the laptop device comparing a hash generated from the received request and another hash obtained by decrypting the cryptographic signature using the public cryptographic key of the mobile device.

After verifying the enrollment request, the laptop device displays a 4-digit passcode for the user, and the user inputs the 4-digit passcode into the mobile device. In addition, the laptop device generates an attestation message that is signed using its private cryptographic key then encrypted based on a symmetric cryptographic key derived from the 4-digit passcode. The mobile device directly receives the encrypted attestation message and decrypts it based on a matching symmetric key derived from the inputted 4-digit passcode. As a result, the mobile device obtains a decrypted attestation message that is cryptographically signed by the laptop device.

The device management system can receive a decrypted attestation message from the unenrolled device. In some instances, the decrypted attestation message is the encrypted attestation message that was decrypted based on the passcode being correctly inputted into the unenrolled device. The device management system updates the signature chain to include the new sequential record for the unenrolled device. In some instances, the new sequential record includes the decrypted attestation message (which in turn includes the set of long-term cryptographic keys), and the new sequential record indicates that the unenrolled device has been associated with the user account as a new enrolled device. Continuing with the above example, the mobile device transmits the decrypted attestation message to the device management system, which enrolls the mobile device by adding a new sequential record to the signature chain of the user account. Once enrolled, the device management system allows the mobile device to access services provided by the videoconference provider. In future login attempts, the device management system can confirm that the mobile device is enrolled by searching through the signature chain.

Certain embodiments described herein provide an improved technique for device enrollment, which can prevent unauthorized users from enrolling devices. For example, the present techniques can prevent MITM attacks, because, even if the encrypted attestation message had been intercepted, the unauthorized users cannot decrypt the attestation message since the passcode for deriving the symmetric key is not transferred between device (rather, the passcode is shown for direct input via user interface). On the other hand, the present techniques can also prevent unauthorized users obtaining the displayed passcode to enroll devices, since the encrypted attestation message only approves the specific unenrolled device to be enrolled in association with the user account. The above advantages facilitate a secure method of enrolling devices in the user account and address potential security vulnerabilities that can be present in conventional techniques.

This illustrative example is given to introduce the reader to the general subject matter discussed herein and the disclosure is not limited to this example. The following sections describe various additional non-limiting examples and examples of systems and methods for hiding private user data in public signature chains.

I. Example Computing Environment for Encryption-based Device Enrollment

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
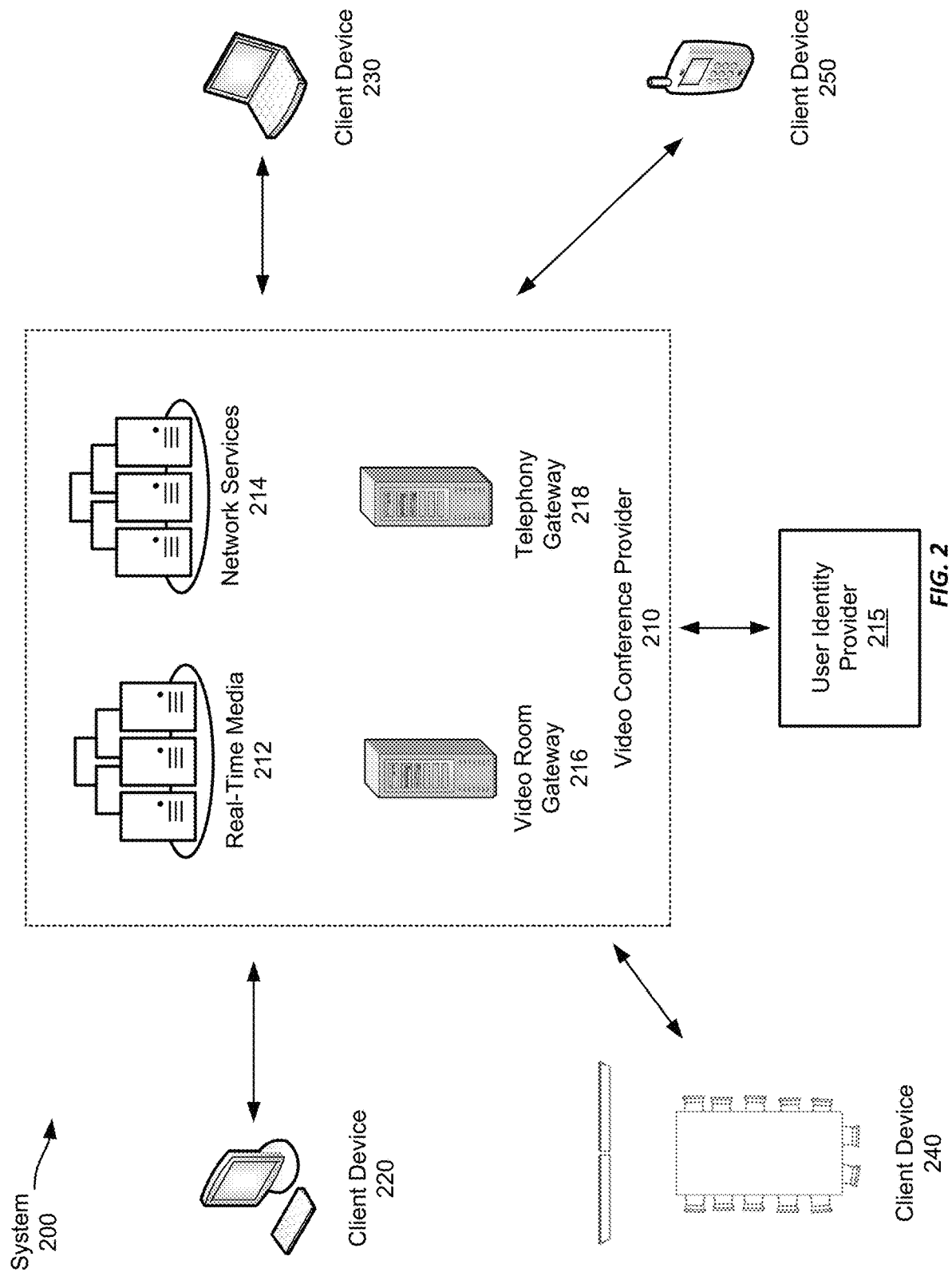
FIG. 2 shows an example system in which a video conference provider provides videoconferencing functionality to various client devices, according to some embodiments.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign-in to the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. While such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia streams in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but not from the respective client device itself, though in other examples it may provide all available streams to all available client devices. Using such a multiplexing technique, the video conference provider 210 may enable multiple different streams of varying quality, thereby allowing client devices to change streams in real-time as needed, based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is joined to the meeting on the telephony device's behalf.

After joining the meeting, the telephony gateway server 218 receives an audio stream from the telephony device and provides it to the corresponding real-time media server 212; likewise the telephony gateway server 218 receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

II. Device Management System

A. Components

Figure 3:
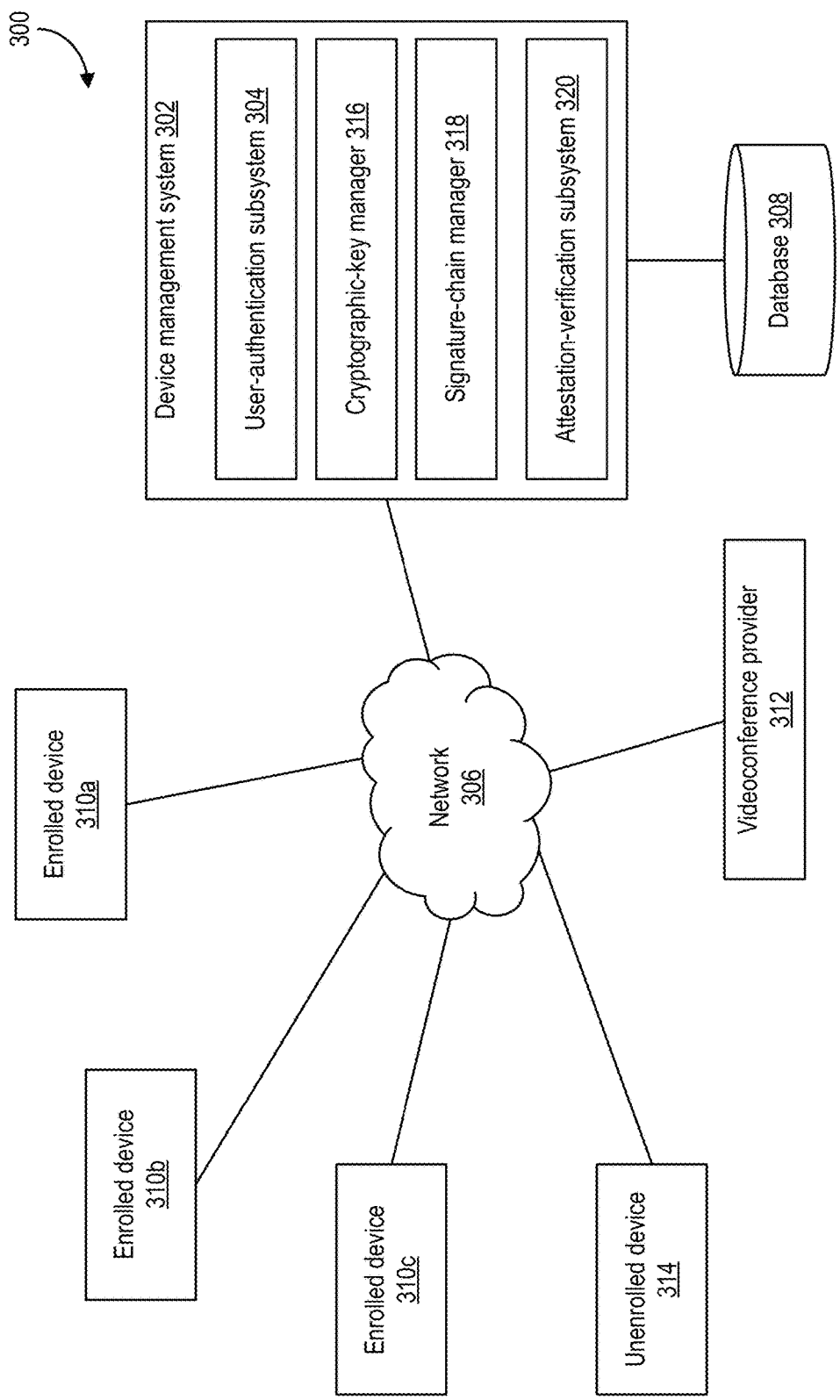
FIG. 3 shows a schematic diagram for encryption-based device enrollment, according to some embodiments.

FIG. 3 shows a schematic diagram of a system 300 for encryption-based device enrollment, according to some embodiments. Referring to FIG. 3, a device management system 302 can include one or more components to facilitate secure enrollment of new devices into a user account, which can prevent malicious attackers from compromising the user account through MITM attacks (for example). In some instances, the device management system 302 includes a user-authentication subsystem 304, a cryptographic-key manager 316, a signature-chain manager 318, and an attestation-verification subsystem 320.

The user-authentication subsystem 304 can retrieve authentication information records from a database 308 that include individual records corresponding with user accounts. The database 308 can be a server that provides database records to the device management system 302, including providing access to cryptographic keys or signature chains associated with the user accounts. In some instances, each of these database records includes a plurality of account credentials for various services (e.g., a video-conferencing service) that are associated with a respective user account. Those account credentials may be used to provide a login service for the respective user. For example, a user can use one of enrolled devices 310a-c to log into a video-conference provider 312 using a username and password for an account that is maintained on the user-authentication subsystem 304. In some instances, the user-authentication subsystem 304 accesses a signature chain associated with the user from the database 308 and determines whether a device identifier of an account-accessing device (e.g., the enrolled device 310b) exists in the signature chain. If so, the user-authentication subsystem 304 indicates that the login is successful, and the user can begin accessing services provided by the videoconference provider 312.

The user-authentication subsystem 304 can also detect an unenrolled device 314 that is used to access the user account. In some instances, the attempt to access the user account includes a user inputting a user identifier and a password of the user account via the unenrolled device 314. In response, the user-authentication subsystem 304 can determine a device identifier of the unenrolled device 314, access a signature chain associated with the user, and determine whether the device identifier of the unenrolled device 314 exists in the signature chain. If the device identifier of the unenrolled device 314 does not exist in the signature, the user-authentication system 304 initiates the device enrollment process for the unenrolled device 314.

The cryptographic-key manager 316 can be implemented in the device management system 203 in order to create, import, and rotate cryptographic keys generated by each of the enrolled devices 310a-c. For example, the cryptographic-key manager 316 can retrieve cryptographic keys associated with an enrolled device (e.g., the enrolled device 310a), and use the cryptographic keys such that data transmitted between the enrolled device and the videoconference provider 312 are encrypted. In some instances, the enrolled device 310a obtains, from the cryptographic-key manager 316, public keys for each of the other client devices participating in a videoconference meeting and securely exchange a set of keys to encrypt and decrypt multimedia content transmitted during the meeting. In some instances, the cryptographic-key manager 316 accesses the cryptographic keys of the enrolled device from a corresponding sequential record of the signature chain associated with the user.

The signature-chain manager 318 can manage a signature chain for each user account of the video conference provider 312. The signature chain can be a cryptographically verifiable ledger to track various transactions performed for the user account. The signature chain can include multiple linked, or "chained" sequential records. In some instances, the sequential record includes identification information corresponding to the user associated with the user account, a device identifier of a corresponding enrolled device, a set of cryptographic keys for encrypting data, a timestamp identifying when the device was added into the signature chain, a sequence number of the sequential record, and the like. The sequential record can also include hashed information linking it to a previous sequential record in the signature chain. The sequential records of the signature chain can reflect various transactions performed for the user account, and the hashed information can ensure integrity of such sequential records. Additional aspects of the signature chains are described in Section III provided herein.

The attestation-verification subsystem 320 can receive and process attestation messages provided by one of the enrolled devices 310a-c, indicating that the unenrolled device 314 can be enrolled into the user account. The attestation message can refer to a machine-readable, programmatically provable statement that the enrolled device can attest that the unenrolled device 314 has been authenticated and should be enrolled into the user account. In some instances, a cryptographic signature of the attestation message is generated using a private cryptographic key of a corresponding enrolled device, at which the attestation-verification subsystem 320 can verify the attestation message by decrypting the cryptographic signature using a public cryptographic key of the enrolled device stored in the signature chain. In some instances, the attestation-verification subsystem 320 compares a timestamp associated with the attestation message with a time at which the attestation message was received, in order to filter stale attestation messages that may have been compromised by malicious attacks.

B. Methods for Encryption-Based Device Enrollment

Figure 4:
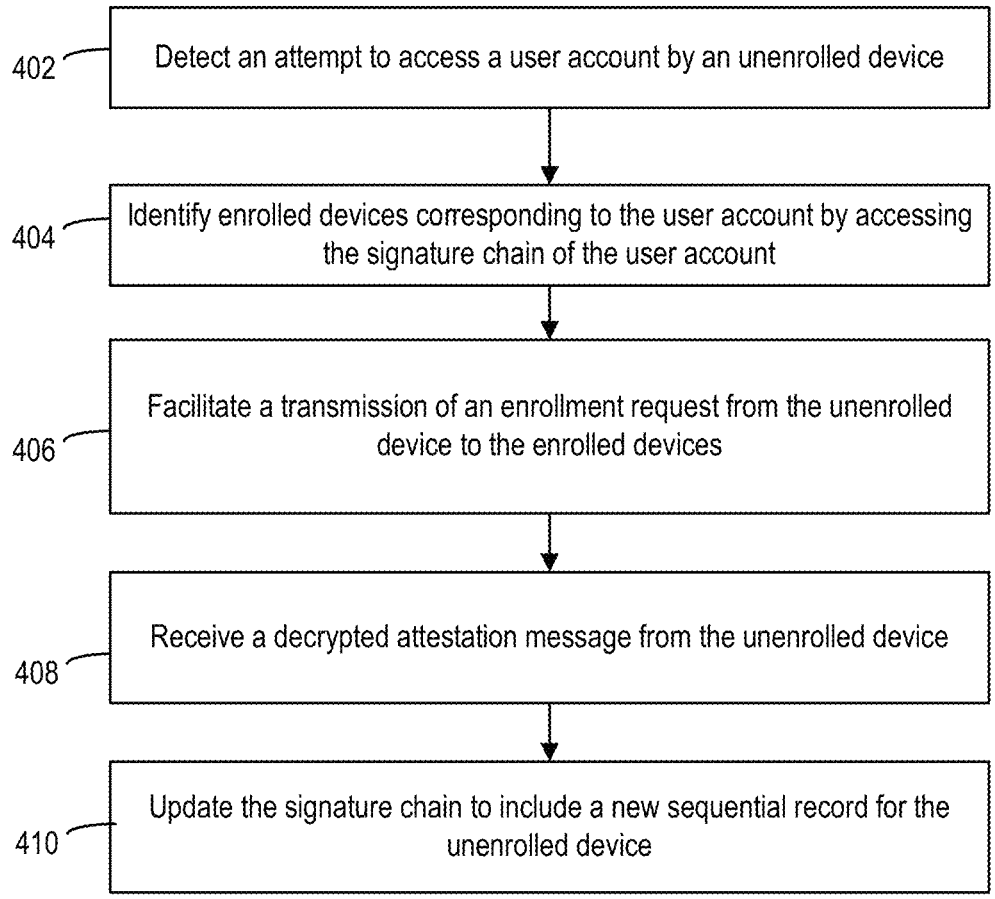
FIG. 4 illustrates a process for encryption-based device enrollment, according to some embodiments.

FIG. 4 illustrates a process 400 for encryption-based device enrollment, according to some embodiments. For illustrative purposes, the process 400 is described with reference to the components illustrated in FIG. 3, though other implementations are possible. For example, the program code for a device management system 302 of FIG. 3, which is stored in a non-transitory computer-readable medium, is executed by one or more processing devices to cause a server system to perform one or more operations described herein.

At step 402, a device management system (e.g., the device management system 302 of FIG. 3) detects an attempt to access a user account by an unenrolled device. The device management system can initially accept account credentials of the user account, including a user identifier and a password. This can allow the device management system to identify the enrolled devices to be used for the encryption-based device enrollment process. In some instances, the device management system accesses a signature chain associated with the user account from the database and detects that a device identifier of the unenrolled device does not exist in the signature chain.

At step 404, the device management system identifies enrolled devices corresponding to the user account by accessing the signature chain of the user account. In some instances, the signature chain includes a sequential record for each of the enrolled devices, in which the sequential record can identify a device identifier of the enrolled device and its respective cryptographic keys. The sequential record can also include hashed information linking it to a previous sequential record in the signature chain. The sequential records of the signature chain can reflect various transactions performed for the user account, and the hashed information can ensure integrity of such sequential records.

At step 406, the device management system facilitates a transmission of an enrollment request and a corresponding cryptographic signature from the unenrolled device to each of the enrolled devices. In some instances, the cryptographic signature is generated using a private cryptographic key of the unenrolled device, to provide an assurance that the enrollment request is not compromised or tampered by another user. The enrollment request can include a set of long-term cryptographic keys to be added into a sequential record in the signature chain for the unenrolled device. In some instances, a public cryptographic key of the unenrolled device is also transmitted to the enrolled devices.

The enrolled devices can be configured to cryptographically validate the enrollment request at least by decrypting the cryptographic signature of the enrollment request using the public cryptographic key of the unenrolled device. In response to cryptographically validating the enrollment request, each of the enrolled devices can allow the user to confirm whether the unenrolled device should be enrolled into the user account (such as with a pop up message).

Once the user confirms through one of the enrolled devices that the unenrolled device should be enrolled, the selected enrolled device can cause a passcode to be displayed and can generate an encrypted attestation message. The encrypted attestation message can indicate that the unenrolled device has been authenticated by the selected enrolled device. In some instances, the encrypted attestation message includes the set of long-term cryptographic keys of the unenrolled device. The encrypted attestation message can be encrypted using a symmetric cryptographic key derived from the passcode. In some instances, the symmetric cryptographic key is derived using a password-based key derivation function (e.g., PBKDF1, PBKDF2). The password-based key derivation function can include applying a hash-based message authentication code (HMAC) to the passcode for a predefined number of times, until the symmetric cryptographic key is generated. The selected enrolled device can transmit the encrypted attestation message to the unenrolled device.

At step 408, the device management system receives a decrypted attestation message from the unenrolled device. In particular, the unenrolled device can receive the encrypted attestation message transmitted from the selected enrolled device. The unenrolled device can decrypt the encrypted attestation message in response to the user inputting the passcode displayed on the enrolled device into the enrolled device via user-interface input. The inputted passcode can be derived into another symmetric cryptographic key that corresponds to the symmetric cryptographic key used by the selected enrolled device to encrypt the attestation message. The unenrolled device can then use the other symmetric cryptographic key to decrypt the encrypted attestation message. Using symmetric keys derived from the passcode prevents other devices from decrypting the attestation message using incorrect passcodes.

At step 410, the device management system updates the signature chain to include a new sequential record for the unenrolled device. In some instances, the new sequential record of the unenrolled device includes the decrypted attestation message and the set of long-term cryptographic keys thereof. In addition, the new sequential record indicates that the unenrolled device has been associated with the user account as a new enrolled device. Process 400 terminates thereafter.

III. Signature Chain

Both accounts and users have states that change over time. For example, a user can change their email address or add and remove devices. To keep track of these states that change over time, the sequence of changes in a data structure called a signature chain (alternatively referred to as "sigchain") can be used. Using sigchains, the only valid changes to this chain can be extensions of the sequence. Since changes cannot be "forgotten," the device management system cannot rewrite portions of the sequence.

In some examples, a sigchain is a sequence of statements or records (alternatively referred to as "links"), where each sequential record includes a collision-resistant hash of the previous link. These sequential records can be considered as state transitions which modify an object (e.g., the sigchain state). For a user sigchain, the sigchain state would contain the list of active devices, list of revoked devices, the trust graph, and the list of email addresses and accounts historically associated with the user. In some instances, a transition is accepted as valid if it satisfies several conditions, including that:

1. The link is of a known type.
2. The link has the correct fields for that type.
3. The transition is admissible given the current state.
4. The link correctly includes the hash of the previous link.
5. Some links require cryptographic signatures by the devices authorizing the transition to be considered valid. In these cases, the signatures are encoded as part of the links to compute link hashes.

Examples of admissibility rules for a user sigchain include that a device can only be revoked if it was in an active state, and that signatures over revocation links must be by another device in the active state. Since each of the links in a sigchain contains a hash of the previous link, the hash of the last link can include a hash of the entire sigchain state. Each sigchain link also contains an incrementing sequence number. For example, a sequential record may be a data structure that identifies a sigchain type, the previous sequential record's sequence number, and the previous sequential record's hash as the sigchain tail:

```
}
  "sigchainType": "User",
  "lastSequenceNumber": 15,
  "lastLinkHash": "484ad7..."
}
```

The sigchain can be queried for the new links and ensure that the first new link contains a previous hash matching the cached tail. The example sigchain is encoded in JSON, but the actual implementation may use different application encodings and data structures that will be apparent to those skilled in the art without departing from the spirit and scope of the disclosure.

In some instances, different applications require different levels of access to sigchains. For example, although a user should be able to fully audit the history of past email addresses stored in their sigchain, other users (e.g., meeting participants) may only need to see the most recent email address in the sigchain to display it in the UI. In this example, rather than being directly encoded, sensitive information on a sigchain link can be obfuscated. An example sigchain link may thus include:

COMMIT(alice@example.com)=HMAC(randomKey; alice@example.com):

Continuing with the above example, an identity provider (e.g., the user identity provider 115) provides the entire sigchain link to users, so that they can check the validity of its signatures and hashes but would not retrieve the plaintext email address (e.g., randomKey is not transmitted). By contrast, authorized users (e.g., Alice's devices) can obtain the sigchain with the plaintext email addresses and 32-byte random keys corresponding to previous email addresses. COMMIT can also be used to selectively delete parts of links such as device names. For example, the identity provider can throw away the random HMAC key as well as the plaintext data, although the signature over the sigchain link will still verify.

A. Types of Signature Chains

Devices, users, and accounts identified in the signature chain can each be internally represented by unique immutable identifiers (e.g., deviceID, userID, accountID). In some instances, each of the devices, users, and accounts is also associated with more user-friendly but mutable identifiers (e.g., device names, email addresses, and account domain names).

In some instances, different types of sigchains are used to represent various different components associated with the user of a service provider (e.g., the video conference provider 110) and their relationships. For example, the following types of signature chains can be considered:

1. For each user identifier (e.g., userID), user sigchains store information related to that user's identity, including the user's email address, account identifiers, and the set of their devices and their trust relationships;
2. For each email address, email sigchains store the associated user identifiers;
3. For each account identifier, account sigchains store both the account domain name ("ADN") and identity provider associated with the account;
4. For each domain name, ADN sigchains keep track of the account identifier to which the domain is associated; and
5. For each account identifier, membership sigchains keep track of the user identifiers associate with the account.

Continuing with the above example, some of the information stored on the above sigchains can be redundant. For instance, a mapping between an email and the corresponding user identifier is recorded both in a user sigchain and in an email sigchain. This can prevent the identity provider from claiming two separate user identifiers being associated with the same email address at the same time. In effect, some operations will cause two or more signature chains to be updated at the same time. Additionally or alternatively, a user can be associated with a subset of the set of signature chains based on an extent and type of information available for the user. For example, if a particular user account only includes a single user and does not have an ADN, then there will be no corresponding account or membership sigchains until the account either obtains another user or an ADN.

B. Adding Sequential Records in Signature Chains

In addition to recording changes to user information, signature chains can be used to enroll one or more devices (e.g., client devices 140-160 of FIG. 1) under the user account. A sequential record of a device can be added into the signature chain in response to authenticating the device and confirming that the device enrollment has been requested by the authorized user. In some instances, a sequential record for an enrolled device includes a set of long-term public device keys. An illustrative example shows a sequential record being represented by the following data structure:

```
{
    "sigchainType": "User",
    "linkType": "DeviceAdd",
    ...
    "deviceID": "ebc0d2...",
    "deviceName": COMMIT({"name":
    "Alice's Work Smartphone", "version": 1}),
    "ed25519PublicKey": "ce8564...",
    "x25519PublicKey": "ad7913...",
    "perUserX25519PublicKey": "c2cce1...",
    "emailChange":
    "accountChange": ...,
    "revokeDeviceIDs": [ "ac98ad...", ...]
}
```

Continuing with the above example, the sequential record includes a device identifier field (e.g., "deviceID"), a signing public cryptographic key field (e.g., "ed25519PublicKey"), an encryption public cryptographic key field (e.g., "x25519PublicKey"), and a device name field (e.g., "deviceName"). For each cryptographic key field, the signature chain can also identify a type of algorithms associated with the public cryptographic key. Further, the device name can be obfuscated to prevent the device name from being revealed to other users. In order to support reuse of device names, the device name can be associated with an incrementing version component which will be visible in a user interface. Device names allow the users to have a human-readable, unambiguous way to distinguish their devices.

In some instances, the sequential record also includes a new per-user public key field (e.g., "perUserX25519PublicKey"). The per-user keys (PUKs) can be symmetric cryptographic keys that can facilitate syncing encrypted data between the user's devices. Devices use the latest per-user key to encrypt all content, but the previous per-user keys are still useful for decrypting older data. In some instances, per-user keys can be asymmetric cryptographic keys that can be used to encrypt data for other users.

C. Other Types of Operations Involving Sequential Records

In addition to enrolling new devices, the device management system can revoke or otherwise remove devices that were previously added into the signature chain by adding a corresponding sequential record. For example, when a device is stolen, lost, or no longer used for the video conference provider, the user can revoke the device from being associated with the user account. If one of the user's valid devices performs the revocation, it can also rotate the PUKs in remaining enrolled devices and sign the sequential record to guarantee integrity of the new PUKs. In addition to revoking devices, device names can be renamed if desired, in which the changes are signed with the corresponding device's public key.

Additionally or alternatively, if the user suspects one of its enrolled devices was temporarily compromised, or if they have institutional key rotation policies, the user can rotate device key and PUKs of each enrolled device. This operation can maintain the same device identifiers but select new signing and encryption keys, as well as a new set of PUKs. After keys are rotated, only signatures and ciphertexts from the new public keys can be used for the corresponding devices. The key rotation can be initiated by adding a sequential record signed by the device's previous public key in addition to the new key.

IV. Authenticating Enrollment Requests

Figure 5:
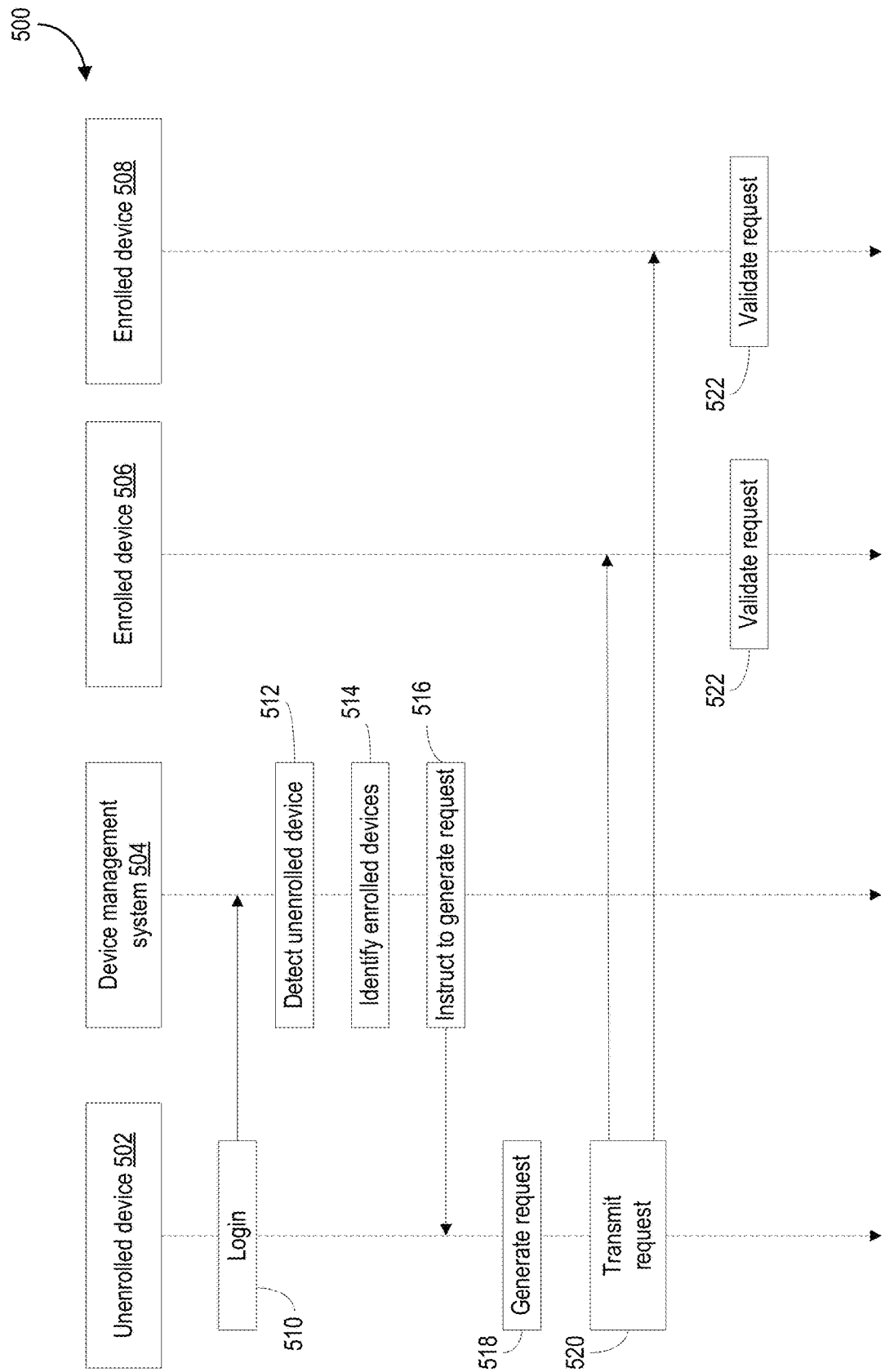
FIG. 5 illustrates a swim lane diagram for a process for authenticating enrollment requests, according to some embodiments.

FIG. 5 illustrates a swim lane diagram for a process 500 for authenticating enrollment requests, according to some embodiments. The process 500 includes an unenrolled device 502 accessing a user account associated with a device management system 504 (step 510). In some instances, the unenrolled device 502 accesses the user account by inputting account credentials of the user account via its user interface.

At step 512, the device management system 504 detects that the unenrolled device 502 is not associated with the user account. In particular, the device management system 504 accesses a signature chain associated with the user account from the database and detects that a device identifier of the unenrolled device does not exist in the signature chain.

At step 514, the device management system 504 identifies one or more enrolled devices that are enrolled in the user account. In some instances, the one or more enrolled devices includes a first enrolled device 506 and a second enrolled device 508. The device management system can determine the one or more enrolled devices that are identified in the signature chain of the user account. The signature chain can include a sequential record for each of the one or more enrolled devices, in which the sequential record can be used to verify that a corresponding enrolled device is associated with the user account. In some instances, the sequential record includes a device identifier of the corresponding enrolled device.

At step 516, the device management system 504 instructs the unenrolled device to generate and transmit an enrollment request and a corresponding cryptographic signature to the one or more enrolled devices (e.g., the first enrolled device 506, the second enrolled device 508). For example, the device management system 504 causes a prompt to be presented on the unenrolled device requesting whether the user would like to enroll the device. In response to the user confirming the prompt, the unenrolled device generates the enrollment request (step 518), which can be transmitted to each of the first and second enrolled devices 506 and 508.

The cryptographic signature can be generated by the unenrolled device 502 generating a hash of the enrollment request and encrypting the hash using a private cryptographic key of the unenrolled device. The hash representing the enrollment request is unique to the enrollment request.

The enrollment request can include a set of long-term cryptographic keys of the unenrolled device that are to be added into a new sequential record of the signature chain. In some instances, the enrollment request further includes a reported location of the unenrolled device. The reported location can be further used to authenticate the enrollment request. For example, the enrolled device can authenticate the enrollment request by comparing the reported location of the unenrolled device and an estimated location of the unenrolled device. The estimated location is determined based on an IP address of the unenrolled device, from which the enrollment request was transmitted.

At step 520, the unenrolled device transmits the enrollment request to each of the first and second enrolled devices 506 and 508. The unenrolled device can also transmit or otherwise avail a public cryptographic key of the unenrolled device that can be used for cryptographically verifying the enrollment request. In some instances, the device management system 504 receives the enrollment request then forwards the enrollment request to each of the first and second enrolled devices 506 and 508.

At step 522, each of the first and second enrolled devices 506 and 508 can cryptographically validate the enrollment request at least by decrypting the cryptographic signature of the enrollment request using the public cryptographic key of the enrolled device. In some instances, each of the first and second enrolled devices 506 and 508 generates their own respective hash of the enrollment request and decrypts the cryptographic signature using the public cryptographic key of the unenrolled device. The enrolled devices then compare the respective hashes of the enrollment request against another hash generated by decrypting the cryptographic signature. If the hashes match, it can be confirmed that the enrollment request has not been modified and the unenrolled device is authenticated. As a result, the one or more enrolled devices can determine that the enrollment request is valid.

V. Processing of an Encrypted Attestation Message

Figure 6:
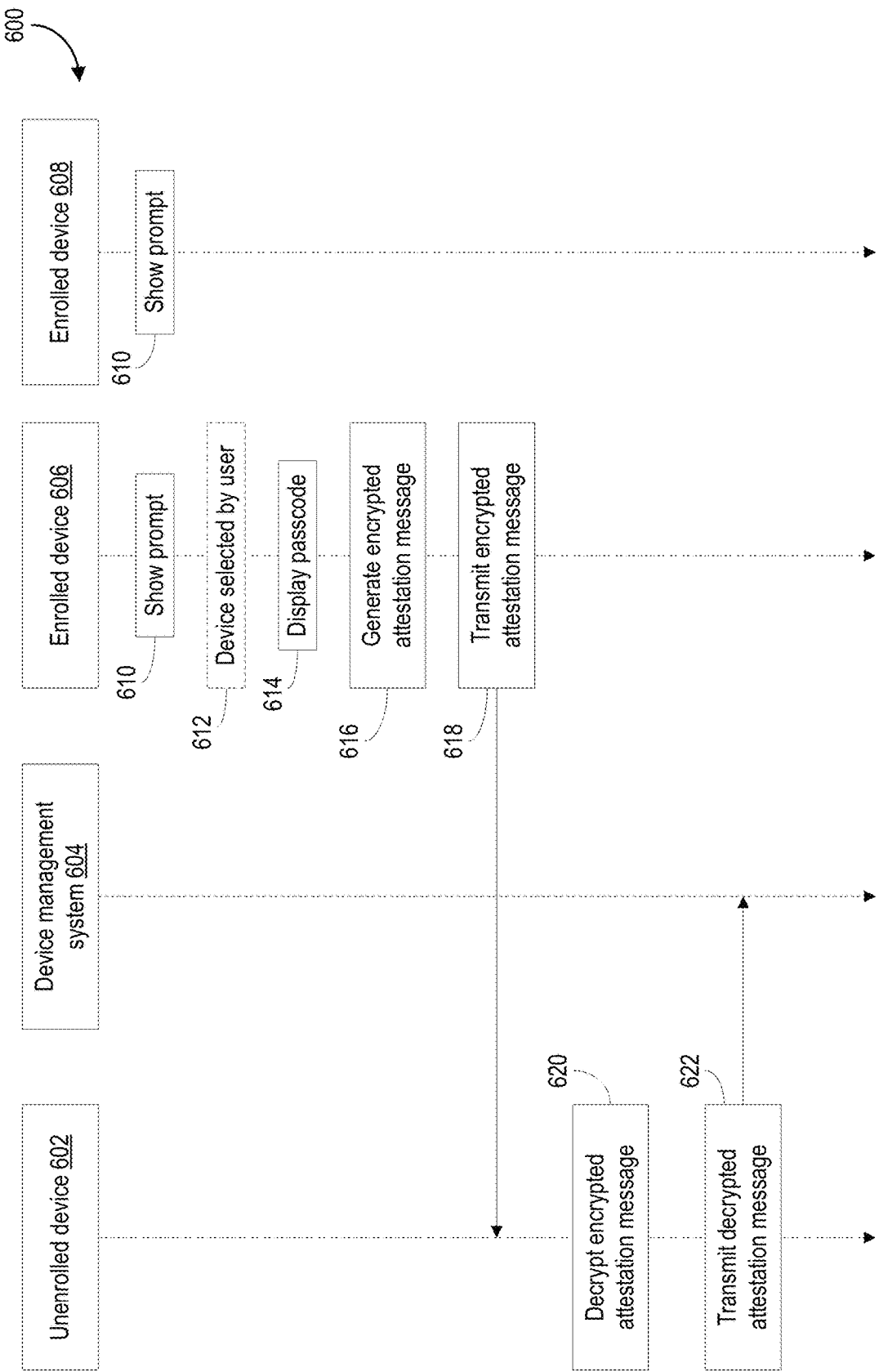
FIG. 6 illustrates a swim lane diagram for a process for processing of an encrypted attestation message, according to some embodiments.

FIG. 6 illustrates a swim lane diagram for a process 600 for processing of an encrypted attestation message, according to some embodiments. Process 600 may be executed after the enrolled devices cryptographically validate the enrollment request (e.g., step 522 of FIG. 5).

At step 610, each of the enrolled devices 606 and 608 displays a prompt requiring the user to confirm whether the unenrolled device 602 should be enrolled into the user account. At step 612, the user selects the enrolled device 606. The enrolled device 606 is selected by the user by responding to the prompt displayed on the enrolled device 606 (e.g., pressing a "Yes" button of the prompt via the user-interface of the enrolled device 606). In some embodiments, only one of the enrolled devices is elected. As a result, each of the remaining enrolled devices can close its respective prompts in response to the selection of the enrolled device 606. For example, the unselected enrolled device 608 can be disengaged and may no longer participate in the device enrollment process.

At step 614, the selected enrolled device displays a passcode. For example, the passcode can include a set of characters (e.g., 6-digit numerical passcode), which the user can retrieve and enter into the unenrolled device.

At step 616, the selected enrolled device 606 generates an encrypted attestation message. The selected enrolled device 606 can initially generate an attestation message, which can include information attesting that the unenrolled device has been authenticated by the selected enrolled device 606. The selected enrolled device 606 can also generate a cryptographic signature of the attestation message using a private cryptographic key of the selected enrolled device 606. The cryptographic signature of the attestation message can be generated before the attestation message is encrypted.

In some instances, the selected enrolled device 606 encrypts the attestation message using a symmetric cryptographic key derived from the passcode. In some instances, the symmetric cryptographic key is derived using a password-based key derivation function (e.g., PBKDF1, PBKDF2). The password-based key derivation function can include applying a hash-based message authentication code (HMAC) to the passcode for a predefined number of times, until the symmetric cryptographic key is generated. As such, in addition to the passcode being inputted to enroll the unenrolled device into the user account, the passcode can be used by the selected enrolled device for encrypting attestation messages. The encryption can prevent unauthorized users from enrolling other devices into the user account simply by intercepting the passcode (e.g., by looking over the user's shoulder).

In some instances, the encrypted attestation message includes a timestamp identifying a time at which the encrypted attestation message was generated. The timestamp can be used by the device management system to confirm whether the encrypted attestation message was received during a time period in which the encrypted attestation message can be received and processed. In addition, the encrypted attestation message can include the set of long-term cryptographic keys of the unenrolled device.

At step 618, the selected enrolled device 606 then transmits the encrypted attestation message to the unenrolled device 602. In some instances, the encrypted attestation message is transmitted using a communication path that is only accessible by the selected enrolled device 606 and the unenrolled device 602. As such, other devices, including the device management system 604, cannot access the communication path. As a result, unauthorized users accessing the user account cannot manipulate the encrypted attestation message being transmitted to the unenrolled device. The selected enrolled device 606 can also transmit the corresponding cryptographic signature of the encrypted attestation message.

At step 620, the unenrolled device 602 can decrypt the encrypted attestation message. Specifically, the user can input the passcode displayed on the enrolled device into the unenrolled device 602 via user-interface input. The inputted passcode can be derived into another symmetric cryptographic key. If the passcode is correct, the other symmetric key would correspond to the symmetric cryptographic key used by the selected enrolled device to encrypt the attestation message. The unenrolled device can then use the other symmetric cryptographic key to decrypt the encrypted attestation message. Using symmetric keys derived from the passcode prevents other devices from decrypting the attestation message using incorrect passcodes.

At step 622, the unenrolled device 602 can transmit the decrypted attestation message to the device management system 604. In some instances, the unenrolled device 602 also transmits the cryptographic signature of the attestation message. As described herein below, the device management system can add the decrypted attestation message as a new sequential record of the signature chain associated with the user account.

VI. Enrolling Unenrolled Device using Signature Chain

Figure 7:
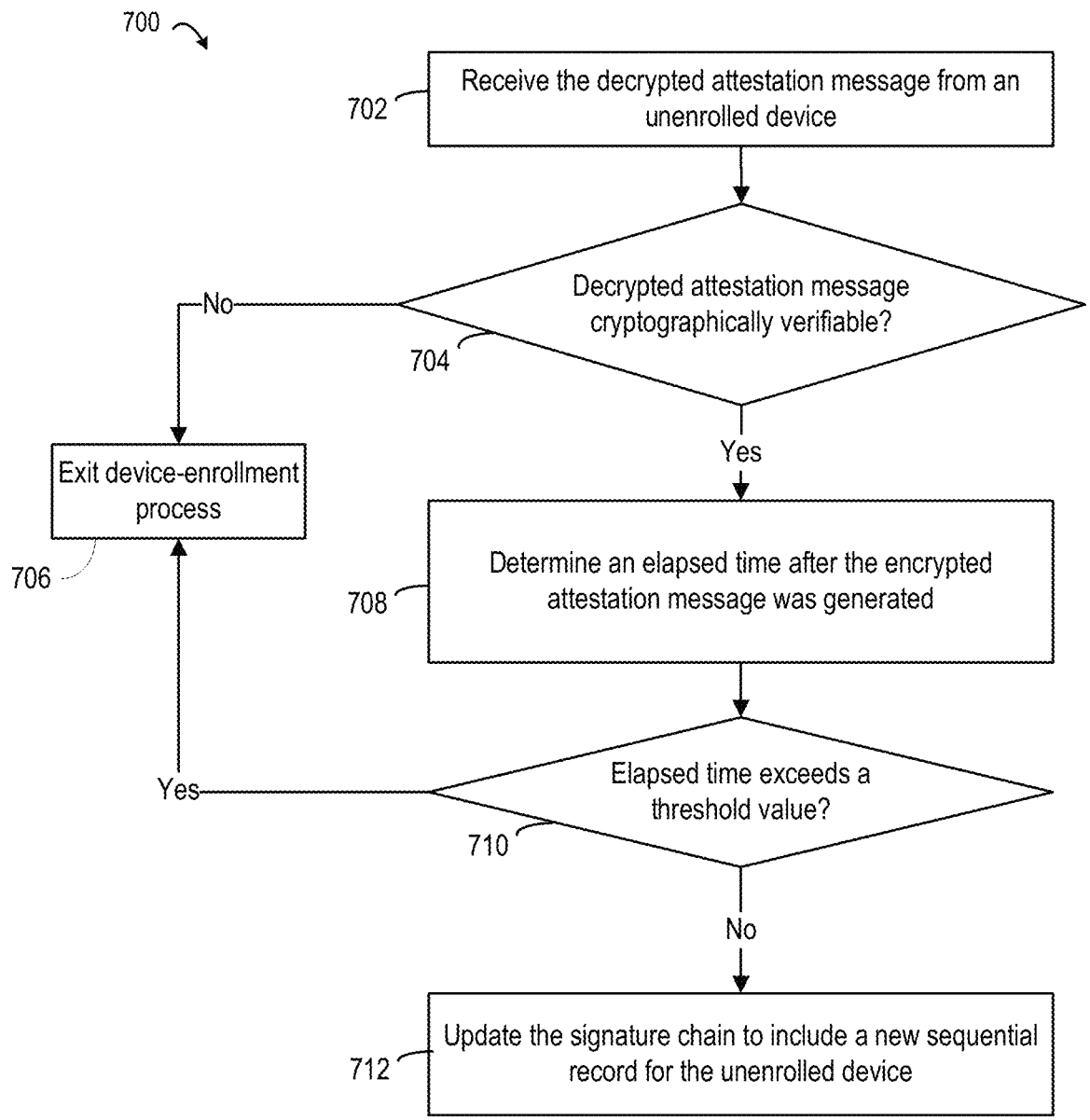
FIG. 7 illustrates a process for enrolling an unenrolled device using signature chains, according to some embodiments.

FIG. 7 illustrates a process 700 for enrolling an unenrolled device using signature chains, according to some embodiments. Process 700 may be executed after the enrolled devices cryptographically validate the enrollment request (e.g., step 522 of FIG. 5). For illustrative purposes, the process 700 is described with reference to the components illustrated in FIG. 3, though other implementations are possible. For example, the program code for a device management system 302 of FIG. 3, which is stored in a non-transitory computer-readable medium, is executed by one or more processing devices to cause a server system to perform one or more operations described herein.

At step 702, a device management system (e.g., the device management system 302 of FIG. 3) receives the decrypted attestation message from an unenrolled device. As described herein, the decrypted attestation message is generated by the unenrolled device decrypting the encrypted attestation message based on an input of a passcode shown on a selected enrolled device (e.g., the selected enrolled device 606 of FIG. 6). The decrypted attestation message can be used to verify that the unenrolled device can be added into the user account. In some instances, the device management system also receives the cryptographic signature of the attestation message, to verify that the message was transmitted by the selected enrolled device.

At step 704, the device management system determines whether contents of the decrypted attestation message can be cryptographically verified. For example, the device management system can generate a hash of the decrypted attestation message and decrypts the cryptographic signature using the public cryptographic key of the selected enrolled device. The device management system can compare the generated hash against another hash generated by decrypting the cryptographic signature. If the hashes do not match, the device management system exits the device-enrollment process (step 706). If the hashes match, the device management system can confirm that the attestation message is authentic and the process continues to step 708.

At step 708, to verify whether the decrypted attestation message was timely received, the device management system can determine an elapsed time between a timestamp of the encrypted attestation message and a time at which the decrypted attestation message was received from the unenrolled device. In some instances, the timestamp identifies a time at which the encrypted attestation message was generated.

At step 710, the device management system compares the elapsed time against a threshold value. If the elapsed time does not exceed the threshold value, the device management system proceeds with the process 700 to update the signature chain to include the new sequential record. If the elapsed time exceeds a threshold value, the device management system exits the device-enrollment process by aborting the update of the signature chain to include the new sequential record (step 706).

At step 712, the device management system updates the signature chain to include the new sequential record for the unenrolled device. In some instances, the new sequential record includes the decrypted attestation message and the long-term cryptographic key of the unenrolled device. Additionally or alternatively, the device management system can output a message that the unenrolled device has been successfully associated with the user account as a newly enrolled device. Process 700 terminates thereafter.

After the new enrollment of the device, the device management system can restrict the newly enrolled device from performing one or more user-account operations for a predetermined period of time. This allows the device management system to provide an additional layer of security by preventing unauthorized users from compromising the user account, even if an unauthorized unenrolled device was somehow successfully enrolled (e.g., the user account had been hacked and the enrolled device had been obtained by the same malicious attacker). In some instances, the restricted user-account operations include enrolling additional devices and/or removing enrolled devices from the signature chain. By contrast, the enrolled devices can remove the newly enrolled device from the user account, to allow the user to maintain control of the user account in the event of a malicious attack.

VII. Additional Considerations

Figure 8:
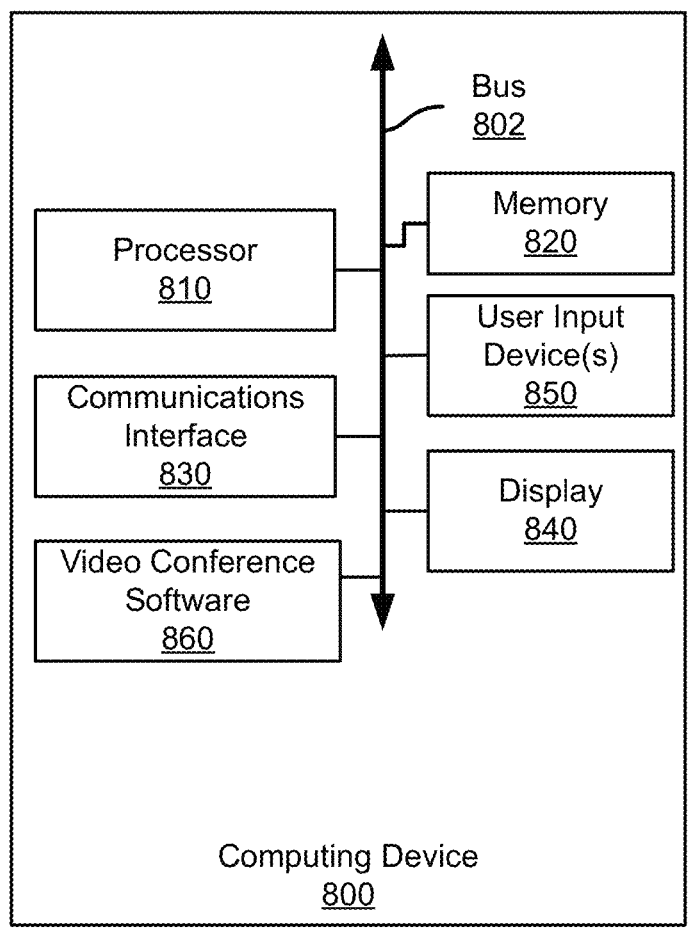
FIG. 8 shows an example computing device suitable for use with systems and methods for encryption-based device enrollment, according to some embodiments.

FIG. 8 shows an example computing device 800 suitable for use in example systems or methods for encryption-based device enrollment, according to some embodiments. The example computing device 800 includes a processor 810 which is in communication with the memory 820 and other components of the computing device 800 using one or more communications buses 802. The processor 810 is configured to execute processor-executable instructions stored in the memory 820 to perform one or more methods for encryption-based device enrollment according to different examples, such as part or all of the example methods described above with respect to FIGS. 4, 5, 6, and 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes video conference software 860 to enable a user to join and participate in a video conference, such as a conventional meeting or webinar, by receiving multimedia streams from a video conference provider, sending multimedia streams to the video conference provider, joining and leaving breakout rooms, such as described throughout this disclosure, etc.

The computing device 800 also includes a communications interface 840. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:
1. A method comprising:
  detecting an attempt to access a user account by an unenrolled device;
  identifying a first enrolled device corresponding to the user account based on a signature chain of the user account;
  facilitating transmission of an enrollment request and a corresponding cryptographic signature from the unenrolled device to the first enrolled device;
  receiving a decrypted attestation message from the unenrolled device, wherein the decrypted attestation mes- sage is generated based on decrypting an encrypted attestation message transmitted by the first enrolled device; and updating, based on the decrypted attestation message, the signature chain to include a second record for the unenrolled device indicating the unenrolled device is enrolled.

2. The method of claim 1, further comprising, after the updating the signature chain, providing access to the user account to the unenrolled device.

3. The method of claim 1, further comprising determining an elapsed time based on a timestamp associated with the decrypted attestation message and a timestamp corresponding to receipt of the decrypted attestation message.

4. The method of claim 3, wherein the updating the signature change is in response to the elapsed time satisfying a threshold value.

5. The method of claim 1, wherein detecting the attempt to access the user account comprises receiving a username and password associated with the user account.

6. The method of claim 1, further comprising:

restricting the enrolled device to perform one or more user-account operations for a predetermined period of time.

7. The method of claim 6, wherein the one or more user-account operations being restricted include enrolling additional unenrolled devices or de-enrolling the first enrolled device.

8. The method of claim 1, wherein:

the enrollment request further includes a reported location of the unenrolled device; and wherein the first enrolled device is configured to authenticate the enrollment request by comparing the reported location of the unenrolled device and an estimated location of the unenrolled device, wherein the estimated location is estimated based on an Internet Protocol address from which the enrollment request was transmitted.

9. A system comprising:

a communications interface;

a non-transitory computer-readable medium; and one or more processors communicatively coupled to the communications interface and the non-transitory computer-readable medium, the one or more processors configured to execute processor-executable instructions stored in the non-transitory computer-readable medium to:

detect an attempt to access a user account by an unenrolled device;

identify a first enrolled device corresponding to the user account based on a signature chain of the user account;

facilitate transmission of an enrollment request and a corresponding cryptographic signature from the unenrolled device to the first enrolled device;

receive a decrypted attestation message from the unenrolled device, wherein the decrypted attestation message is generated based on decrypting an encrypted attestation message transmitted by the first enrolled device; and update, based on the decrypted attestation message, the signature chain to include a second record for the unenrolled device indicating the unenrolled device is enrolled.

10. The system of claim 9, wherein the one or more processors are configured to execute further processor-executable instructions stored in the non-transitory computer-readable medium to, after the updating the signature chain, provide access to the user account to the unenrolled device.

11. The system of claim 9, wherein the one or more processors are configured to execute further processor-executable instructions stored in the non-transitory computer-readable medium to determine an elapsed time based on a timestamp associated with the decrypted attestation message and a timestamp corresponding to receipt of the decrypted attestation message.

12. The system of claim 11, wherein the updating the signature change is in response to the elapsed time satisfying a threshold value.

13. The system of claim 9, wherein the one or more processors are configured to execute further processor-executable instructions stored in the non-transitory computer-readable medium to receive a username and password associated with the user account.

14. The system of claim 9, wherein the one or more processors are configured to execute further processor-executable instructions stored in the non-transitory computer-readable medium to restrict the enrolled device to perform one or more user-account operations for a predetermined period of time.

15. The system of claim 14, wherein the one or more user-account operations being restricted include enrolling additional unenrolled devices and/or de-enrolling the first enrolled device.

16. The system of claim 9, wherein:

the enrollment request further includes a reported location of the unenrolled device; and wherein the first enrolled device is configured to authenticate the enrollment request by comparing the reported location of the unenrolled device and an estimated location of the unenrolled device, wherein the estimated location is estimated based on an Internet Protocol address from which the enrollment request was transmitted.

17. A non-transitory computer-readable medium comprising processor-executable instructions configured to cause one or more processors to:

detect an attempt to access a user account by an unenrolled device;

identify a first enrolled device corresponding to the user account based on a signature chain of the user account;

facilitate transmission of an enrollment request and a corresponding cryptographic signature from the unenrolled device to the first enrolled device;

receive a decrypted attestation message from the unenrolled device, wherein the decrypted attestation message is generated based on decrypting an encrypted attestation message transmitted by the first enrolled device; and update, based on the decrypted attestation message, the signature chain to include a second record for the unenrolled device indicating the unenrolled device is enrolled.

18. The non-transitory computer-readable medium of claim 17, further comprising processor-executable instructions configured to cause the one or more processors to determine an elapsed time based on a timestamp associated with the decrypted attestation message and a timestamp corresponding to receipt of the decrypted attestation message.

19. The non-transitory computer-readable medium of claim 18, wherein the updating the signature change is in response to the elapsed time satisfying a threshold value.

20. The non-transitory computer-readable medium of claim 17, further comprising processor-executable instructions configured to cause the one or more processors to restrict the enrolled device to perform one or more user-account operations for a predetermined period of time.

\* \* \* \* \*